United States Patent

Moakes et al.

[19]

[11] Patent Number: 5,947,143
[45] Date of Patent: Sep. 7, 1999

[54] FAST ACTING DEPLOYMENT DEVICE FOR HIGH PRESSURE VESSELS

[75] Inventors: Richard Moakes, Flemington; Michael Dosch, Lake Hiawatha; Peter Materna, Metuchen; John Soemer, Flanders; Geoffrey Lawrence Mahon, Ridgewood, all of N.J.

[73] Assignee: Breed Automotive Technology, Inc., Lakeland, Fla.

[21] Appl. No.: 08/808,819

[22] Filed: Feb. 28, 1997

[51] Int. Cl.⁶ .............................. F16K 17/16; F16K 17/40
[52] U.S. Cl. .................. 137/69; 137/68.13; 137/68.22; 137/68.23
[58] Field of Search .................... 137/67, 68.13, 137/68.19, 68.22, 68.23, 69

[56] References Cited

U.S. PATENT DOCUMENTS

| | | |
|---|---|---|
| 1,874,356 | 8/1932 | Rowley . |
| 1,900,764 | 3/1933 | Rowley . |
| 2,115,371 | 4/1938 | Mossberg . |
| 2,154,827 | 4/1939 | Wangenheim . |
| 2,831,492 | 4/1958 | Bising ............................ 137/69 |
| 3,017,894 | 1/1962 | Chilcoat ......................... 137/69 |
| 3,209,937 | 10/1965 | Hirst et al. . |
| 3,472,284 | 10/1969 | Hosek ...................... 137/68.23 X |
| 3,647,109 | 3/1972 | Hebblethwaite ............... 220/47 |
| 3,915,237 | 10/1975 | Rozniecki ...................... 169/62 |
| 4,020,860 | 5/1977 | Fournier et al. ............... 137/69 |
| 4,203,616 | 5/1980 | Okada ........................... 280/737 |
| 4,204,703 | 5/1980 | Okada ........................... 280/734 |
| 4,275,901 | 6/1981 | Okada ........................... 280/741 |
| 4,289,327 | 9/1981 | Okada ........................... 280/737 |
| 4,520,838 | 6/1985 | Fisher et al. .................. 137/69 |
| 4,561,630 | 12/1985 | McCulloch ..................... 251/84 |
| 4,619,285 | 10/1986 | Piet ........................... 137/69 X |
| 5,362,099 | 11/1994 | Fohl ............................. 280/737 |
| 5,474,328 | 12/1995 | Nilsson ......................... 280/737 |
| 5,609,359 | 3/1997 | Johnson et al. ............... 280/736 |

*Primary Examiner*—John Rivell
*Attorney, Agent, or Firm*—L. R. Drayer

[57] ABSTRACT

A release mechanism for releasing high pressure fluid from an associated pressure vessel has connecting means for connecting to the pressure vessel, a support sleeve which has an axial and a radial opening, a sealing disc, supporting means which may be a trap door, a rotatable column, or a support plug and a protractor or retractor for selectively removing the supporting means and thus opening the sealing means. The sealing means can also be opened spontaneously, operating as a relief valve.

5 Claims, 8 Drawing Sheets

FAST ACTING DEPLOYMENT DEVICE FOR HIGH PRESSURE VESSELS

BACKGROUND OF THE INVENTION

1. Field of Invention

This invention pertains to the art of methods and apparatuses for use with high pressure fluid systems, and more specifically to methods and apparatuses for use in releasing high pressure fluid from an associated pressure vessel.

2. Description of the Related Art

It is well known in various technologies to require the rapid release of pressurized fluid from a pressure vessel. Examples of such technologies include vehicle occupant inflatable restraints and fire suppression systems.

It is known in the art to provide a relatively weak burst disc, unable by itself to withstand the internal pressure of the pressurized fluid, which is in turn supported by a structural support. When it is desired to release the pressurized fluid from the pressure vessel, the structural support is somehow removed or broken allowing the burst disc to burst. Various methods are known for removing the structural support and include, manual actuation, thermal actuation, hydraulic/pneumatic actuation, actuation by a mechanical acceleration sensor, and actuation by an unconfined pyrotechnic device. A pyrotechnic device uses an explosive pyrotechnic material. Typically the explosive pyrotechnic material is ignited by an electric signal. For unconfined pyrotechnic devices, which are the only ones known to be used in the art, the products of combustion are released outside of the pyrotechnic device.

A problem commonly encountered in the art deals with the amount of pyrotechnic material required with unconfined pyrotechnic devices. Typically, such unconfined pyrotechnic devices require relatively large amounts of pyrotechnic material. Such large amounts of pyrotechnic material may result in devices which must be classified as pyrotechnic devices which require special care in shipping and handling.

The present invention uses a self-contained pyrotechnic device known as a self-contained pyrotechnic actuator. Thus, the problem mentioned above is overcome in a way which is simple and efficient, while providing better and more advantageous results.

SUMMARY OF THE INVENTION

In accordance with one aspect of the invention there is provided a release mechanism for releasing high pressure fluid from an associated pressure vessel. The release mechanism has connecting means for connecting to the pressure vessel, a support sleeve which has two openings, an axial opening and an offset linear opening, a sealing disc, supporting means which may be a trap door or a rotatable column, and a protractor or retractor for selectively removing the supporting means and thus opening the sealing means.

In accordance with another aspect of the invention there is provided a release mechanism that has two opening means for releasing high pressure fluid from an associated pressure vessel. One opening means selectively removes the supporting means. The other opening means automatically opens the sealing means, operating as a relief valve.

In accordance with another aspect of the invention there is provided a release mechanism for releasing high pressure fluid from an associated pressure vessel having an opening. The release mechanism has connecting means for connecting the release mechanism to the opening in the associated pressure vessel, sealing means for sealing the opening of the connecting means, supporting means for supporting the sealing means and, a self-contained pyrotechnic actuator for selectively removing the supporting means.

In accordance with another aspect of the invention there is provided a method for releasing high pressure fluid from an associated pressure vessel. An electrical control signal is sent to a protractor which then extends, sliding a slidable support member within a channel. Once the slidable support member slides far enough, a trap door pivots about a hinge pin allowing the sealing means to rupture.

In accordance with still another aspect of the invention there is provided another method for releasing high pressure fluid from an associated pressure vessel. An electrical control signal is sent to a retractor. The retractor retracts, removing a support from the sealing means allowing it to rupture.

One advantage of the present invention is that fluids can be controlled and deployed over a very wide pressure range in a very fast reaction time.

Another advantage of the invention is that it is a relatively inexpensive method for releasing fluids at very high pressures.

Another advantage of the invention is that it is reusable after deployment. The sealing means can be replaced, the trap door reseated and a new protractor fitted.

Still another advantage of the invention is that its quick reaction time, on the order of 3 milliseconds from first electrical signal input to first escape of fluid, makes it attractive for vehicle occupant inflatable restraint systems and automatic fire suppression systems.

Another advantage of the invention is that it can be qualified as a nonexplosive mechanism.

Another advantage of the invention is that it responds to a relatively weak electrical signal and provides opening of a pressure vessel without releasing or adding any combustion products to the contents of the vessel.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
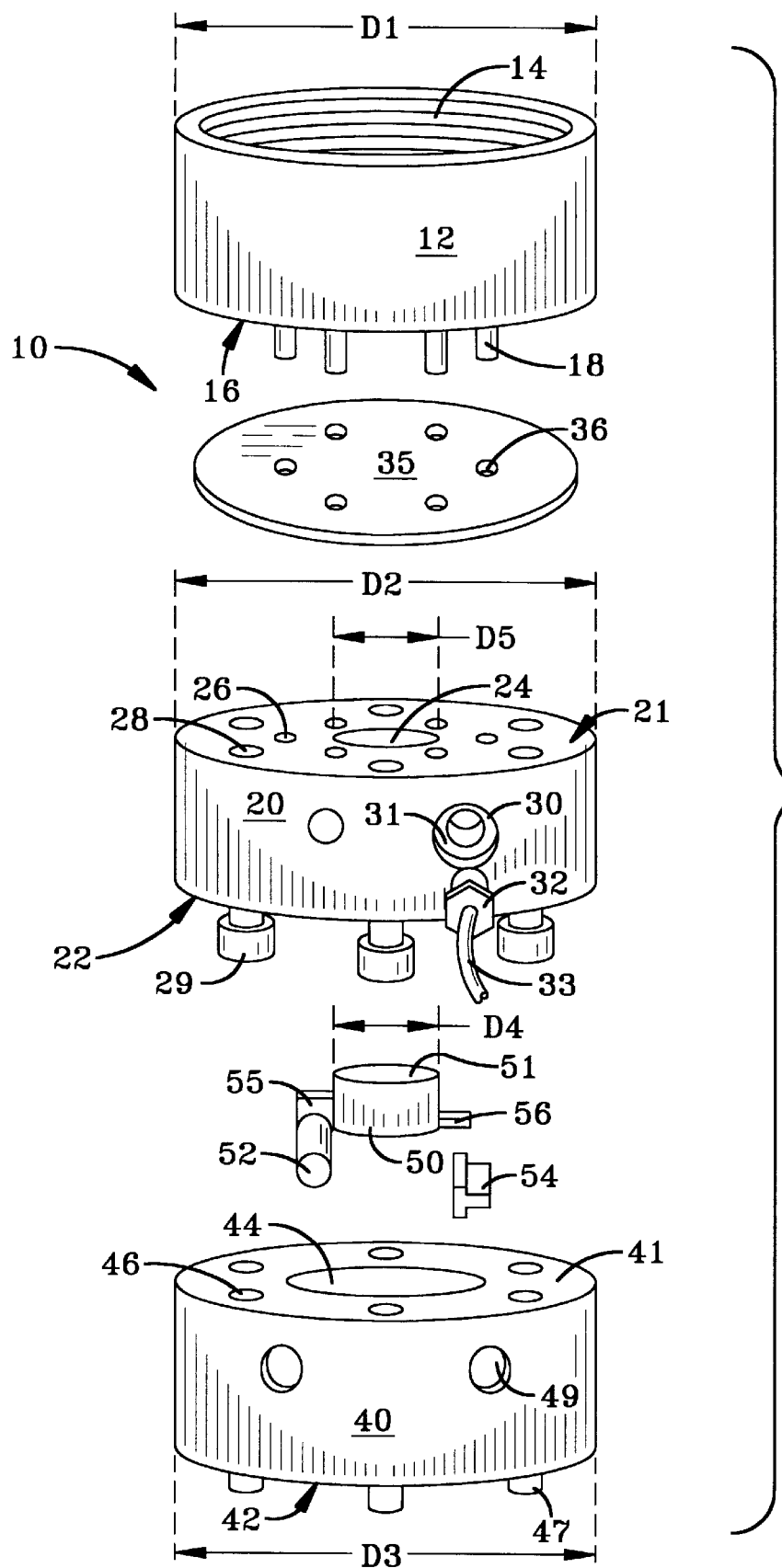
FIG. 1 is an exploded, perspective, assembly view of the release mechanism of this invention called the trap door embodiment.
Figure 2:
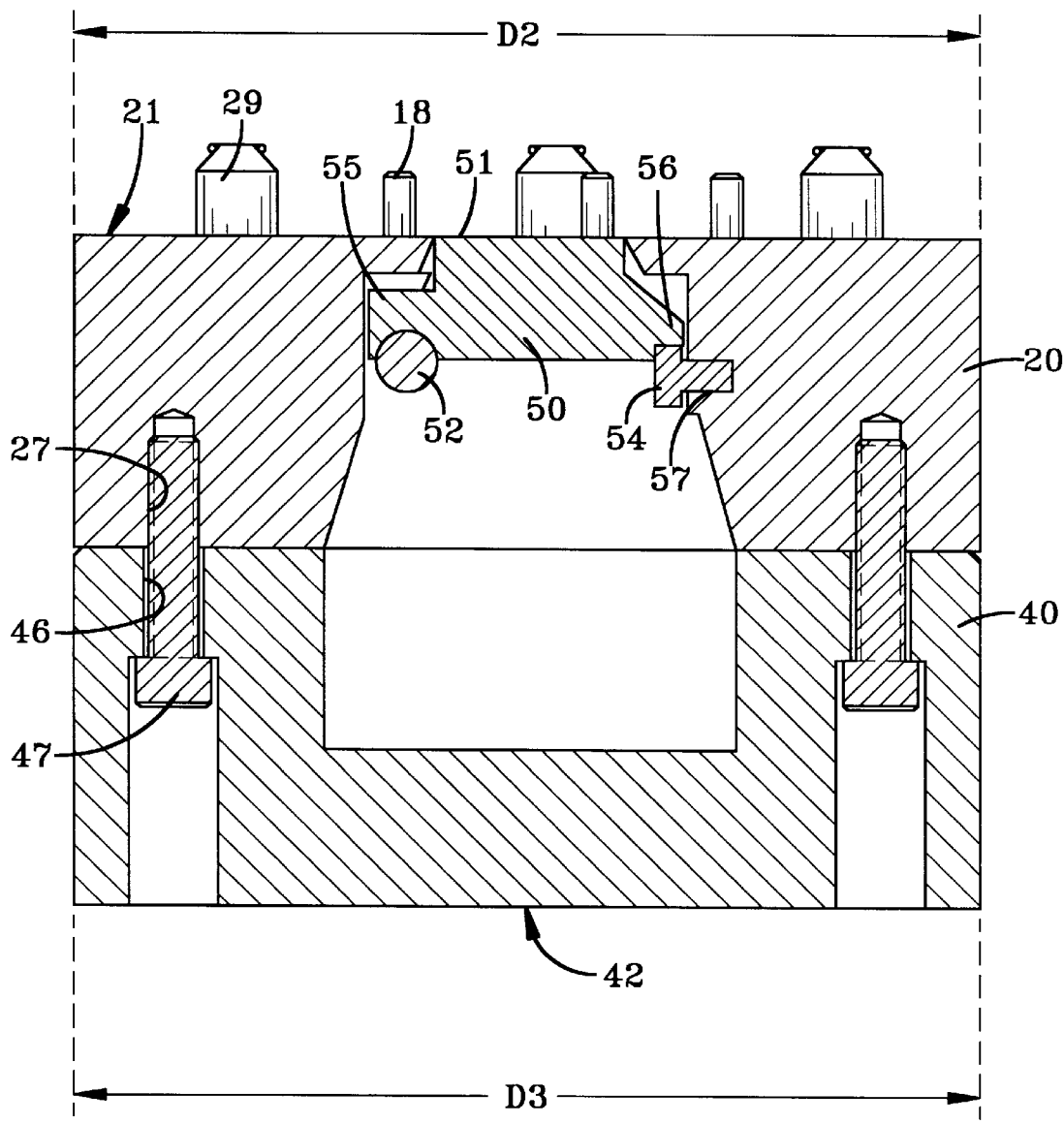
FIG. 2 is a cross-sectional view of the support sleeve and thrust diverter of the trap door embodiment taken along the longitudinal axis and showing the trap door in a closed position.
Figure 3:
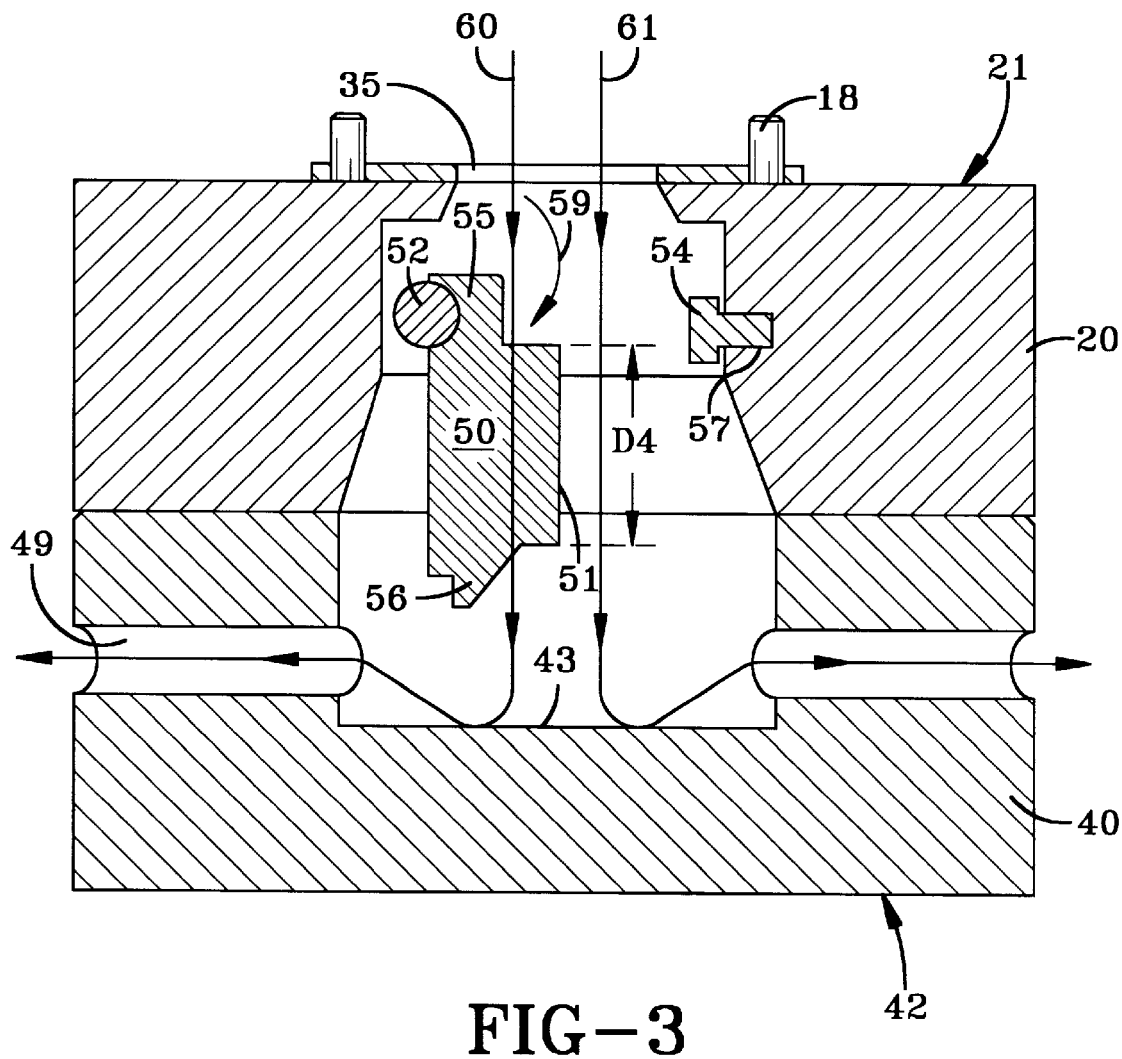
FIG. 3 is a cross-sectional view of the support sleeve and thrust diverter taken along the longitudinal axis at a slightly different angle than illustrated in FIG. 2 in order cut along the centerlines of holes 49 to show the operation of such holes and showing the trap door in an open position.

Referring now to the drawings wherein the showings are for purposes of illustrating a preferred embodiment of the invention only and not for purposes of limiting the same, FIGS. 1–3 show the release mechanism 10 of the present invention. This invention works with both compressible and non-compressible fluids over a very wide pressure and temperature range. Typical applications of the release mechanism 10 disclosed include fire suppression systems, vehicle occupant inflatable restraints, and other similar applications where fluids are released quickly.

With reference to FIG. 1, the release mechanism 10, to be known herein after as the trap door embodiment, includes a connecting member 12 for connecting to an associated pressure vessel (not shown). The associated pressure vessel contains high pressure fluid. The connecting member 12 has threads 14 for screwing onto the pressure vessel although other connecting means can be chosen with sound engineering judgment. The connecting member has a substantially cylindrical shape with a diameter D1. On its end 16, the connecting member 12 has an opening (not visible) concentrically located. Dowel pins 18 attach to dowel holes (not visible) in the lower end 16 of the connecting member 12 and will be discussed in more detail following. It should be noted that dowel pins are not required but may be beneficial in some applications determined with sound engineering judgment.

With reference now to FIGS. 1–3, the release mechanism 10 includes a support sleeve 20 which has a substantially cylindrical shape with a diameter D2. The support sleeve 20 has a first end 21 and a second end 22. An axial opening 24 is centrally located on the first end 21 and is concentric with the opening (not visible) on the end 16 of the connecting member 12. Also located on the first end 21 of the support sleeve 20 are dowel pin holes 26 and first bolt holes 28. As noted above dowel pins are not required and thus dowel pin holes are not essential either. First bolt holes 28 receive bolts 29 which extend through the support sleeve 20 and into second bolt holes (not visible) on the end 16 of the connecting member 12. The bolts 29 hold the support sleeve 20 to connecting member 12 by mating first end 21 and end 16.

The support sleeve 20 also has an offset linear opening 30 which has threads 31 for receiving a self-contained pyrotechnic actuator which in this embodiment is protractor 32. Offset linear opening 30 is termed offset because it is offset from a parallel line (not shown) extending radially through support sleeve 20. However, equivalent performance may be had by other opening configurations, such as linear and curvilinear paths which lie in planes perpendicular or skew to the plane containing the axis of rotation of support sleeve 20. The protractor 32, sometimes known as a gas motor, can be of any type currently available and chosen with sound engineering judgment. The protractor 32 contains a small quantity of explosive material which is ignited by an electrical signal. The products of combustion are contained inside the body of the protractor 32 and have no escape path. This means that the protractor 32 releases nothing to the environment and is totally clean and self-contained. Frequently, a protractor 32 can be classified for shipping and handling purposes as a nonexplosive device. The preferred protractor 32 is available from ICI Nobel's Explosives of Ayrshire, Scotland. The proper size and type of protractor 32 is selected by sound engineering judgment depending on the use for the release mechanism 10. The protractor 32 has electrical contact means 33 for receiving an electrical control signal which would activate the protractor 32.

With continuing reference to FIGS. 1–3, the release mechanism 10 includes a thrust diverter 40 which has a substantially cylindrical shape with a diameter D3. It should be noted that in the preferred embodiment the diameter D1 of the connecting member 12, the diameter D2 of the support sleeve 20, and the diameter D3 of the thrust diverter 40 are substantially the same but equal diameters are not required for this invention. The thrust diverter 40 has a first end 41 and a second end 42. An axial opening 44 is centrally located on the first end 41 and is concentric with opening 24 in the insert member 20. Also located on the first end 41 are bolt holes 46 which receive bolts 47. As is best seen in FIG. 2, the bolts 47 extend through the thrust diverter 40 and into second bolt holes 27 in the support sleeve 20 holding the thrust diverter 40 to the inset ring 20 by mating ends which are first end 41 and second end 22 of the support sleeve 20. The thrust diverter 40 also has a plurality of holes 49 for diffusing the high pressure fluid.

With continuing reference to FIGS. 1–3, the release mechanism 10 also includes sealing means which in this embodiment is a sealing disc 35 which is interposed or sandwiched between the end 16 of the connecting member 12 and the first end 21 of the support sleeve 20. The sealing disc 35 is made of a thin metal such as stainless steel, copper or brass. The type and thickness of metal is chosen dependent upon the designed pressure range for the device 10. This design permits the sealing disc 35 to be a simple flat foil which can be stamped from shim stock or flat foil. This minimizes cost. In any case, the sealing disc 35 is designed such that it cannot, alone, fully support the pressure of the fluid in the associated pressure vessel (not shown). In the case of very high fluid pressures it would be necessary to secure sealing disc 35 in place to prevent it from extruding through axial opening 24. One option is to weld the sealing disc 35 by means currently known in the art to connecting member 12 or to support sleeve 20. This would improve the leak-tightness of the overall device. Another option is to secure the sealing disc 35 using dowel pins 18. Other securing means may also be used when chosen with sound engineering judgment. The dowel pins 18 extend through dowel pin holes (not shown) in the end 16 of the connecting member 12, through dowel pin holes 36 in the sealing disc 35, and through dowel pin holes 26 in the first end 21 of the support sleeve 20. Since the dowel pins when first installed are separate pieces, they can be placed first in the connecting member 12 as shown in FIG. 1 or they can be placed first in the support sleeve 20 as shown FIGS. 1–3.

Figure 6:
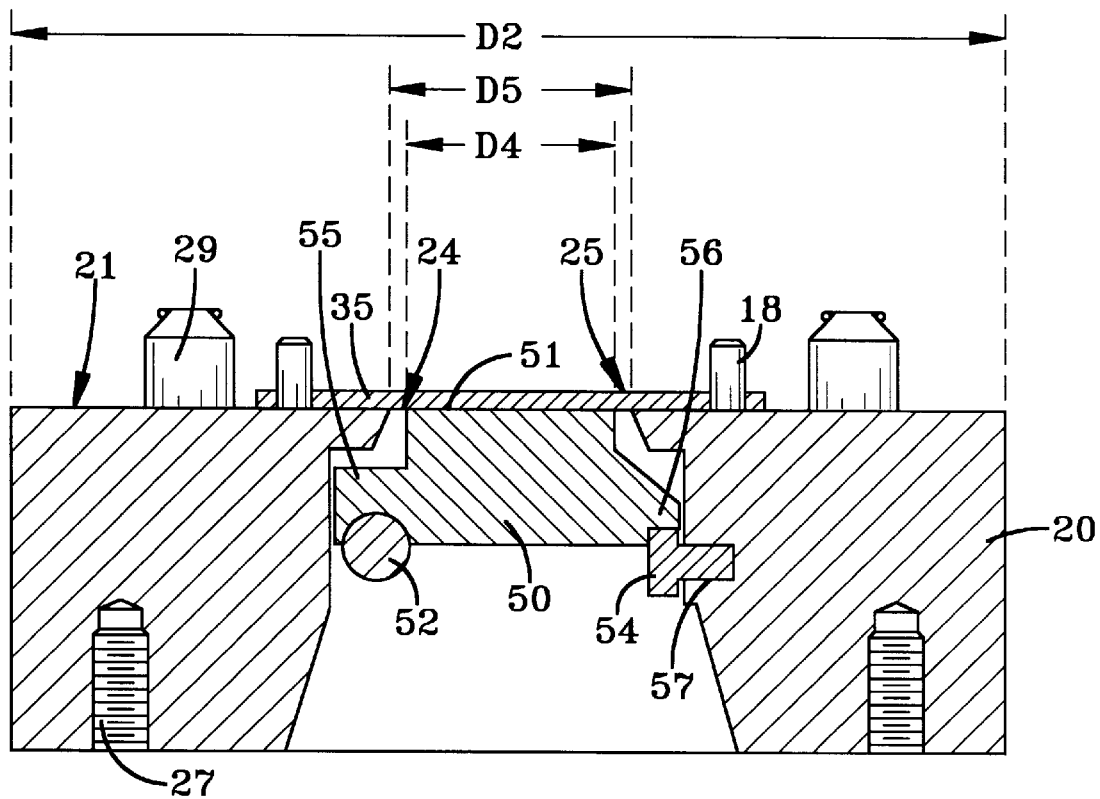
FIG. 6 is a cross-sectional view of the support sleeve and trap door of the trap door embodiment illustrating the invention working as a relief valve.

With reference now to FIGS. 1–3, 6, and 9–10, a supporting means, in this embodiment a trap door 50 having first and second sides 55, 56 is used to provide the necessary support to sealing disc 35 so that it can withstand the pressure of the fluid in the associated pressure vessel. The trap door 50 has a substantially circular end 51 which, while closed as seen in FIGS. 2 and 6, is coplanar with the first end 21 of the support sleeve 20 and contacts the sealing disc 35. The trap door 50 is pivotably supported on its first side 55 by hinge pin 52 which is fixedly attached to the support sleeve 20. The trap door 50 is also supported on its second side 56 by a slidable support member which in this embodiment is T-shaped member 54. The trap door 50, as seen best in FIG. 9, can be made as a single part. Alternately, as seen best in FIG. 10, a trap door 53 can be made of two components—cap 13 having notch 17 and bar 15 which is received within notch 17. This is advisable when the release mechanism will be re-used because nose section 19 of bar 15 can wear from the repeated sliding of the slidable support member, such as T-shaped member 54. Should this wearing occur, the bar 15 can simply be replaced without replacing the entire trap door 53. It should be noted that the slidable support member could have other shapes, such as rectangular, as well. T-shaped member 54 is slidably positioned within channel 57 of support sleeve 20. Channel 57 is located so that its longitudinal axis is parallel to the longitudinal axis of offset linear opening 30. In this preferred embodiment as is best shown in FIG. 6, the diameter D4 of end 51 is significantly and proportionally smaller than the diameter D5 of axial opening 24. While the actual dimensions for diameters D4, D5 can be any chosen with sound engineering judgment, for purposes of this embodiment it has been found that for most applications diameter D4 should fall within the range of 50–99% of diameter D5. This arrangement provides an annular area 25 of disc 35 beyond the diameter D4 of end 51 that is not supported. This annular area 25 is where spontaneous rupture occurs in an over-pressure situation. In this way the release mechanism 10 acts as a pressure relief valve.

With reference to FIGS. 1–3, 6, the release mechanism 10 selectively releases the fluid within the associated pressure vessel via an electrical control signal sent via electrical contact means 33 to the protractor 32. When the protractor 32 receives the electrical signal, the protractor 32 extends a piston (not shown in FIGS. 1–3 but shown as 71 in FIG. 4) which slides T-shaped member 54 along channel 57 until the second side 56 of the trap door 50 is no longer supported by the T-shaped member 54. The trap door 50 is loaded by the fluid pressure transmitted through the sealing disc 35. The load causes the trap door 50 to pivot clockwise 59 (as shown in FIG. 3) about hinge pin 52 and the trap door 50 is caught within thrust diverter 40. The sealing disc 35, which cannot support the fluid pressure alone, ruptures, thereby allowing the fluid to form flow paths 60, 61 which pass through the opening in the connecting member 12, continue to move through the axial opening 24 in the support sleeve 20, to flow over and around trap door 50, to pass through the axial opening 44 in the thrust diverter 40, to deflect off end 43 and finally, to exit through the plurality of holes 49 in the thrust diverter 40. In this way protractor 32 opens the sealing disc 35, i.e., acts as an opening means for selectively opening the sealing means. Another opening means, discussed above, is annular area 25 which spontaneously ruptures, i.e., opens, in an over-pressure situation.

As can be seen in FIG. 3, flow paths 60, 61 exit in opposite directions, neutralizing the thrust created by the momentum generated by the releasing fluid from the associated pressure vessel. In this way the thrust diverter 40 diverts and directs the thrust of the releasing fluid, neutralizing and zeroing the thrust force.

With reference to FIGS. 1–3, it should be noted that threads 14, bolts 29 along with bolt holes 28 and, bolts 47 along with bolt holes 46 are not required for this invention. It may be desirable to simply weld or otherwise attach, as is currently known in the art, the connecting member 12, the support sleeve 20 and the thrust diverter 40 to each other, to sealing disc 35 and to the pressure vessel (not shown). This is true, for example, when the release mechanism 70 is to be used as a one-time-use device such as for vehicle occupant inflatable restraints. For other uses such as when the release mechanism 70 is to be reused however, the afore mentioned bolts 29, 47 and threads 14 along with the dowel pins 18 are desirable. The sealing disc 35 can be replaced, the trap door 50 reseated and a new protractor 32 can be fitted. This may be desirable, for example, with fire suppression systems.

Figure 4:
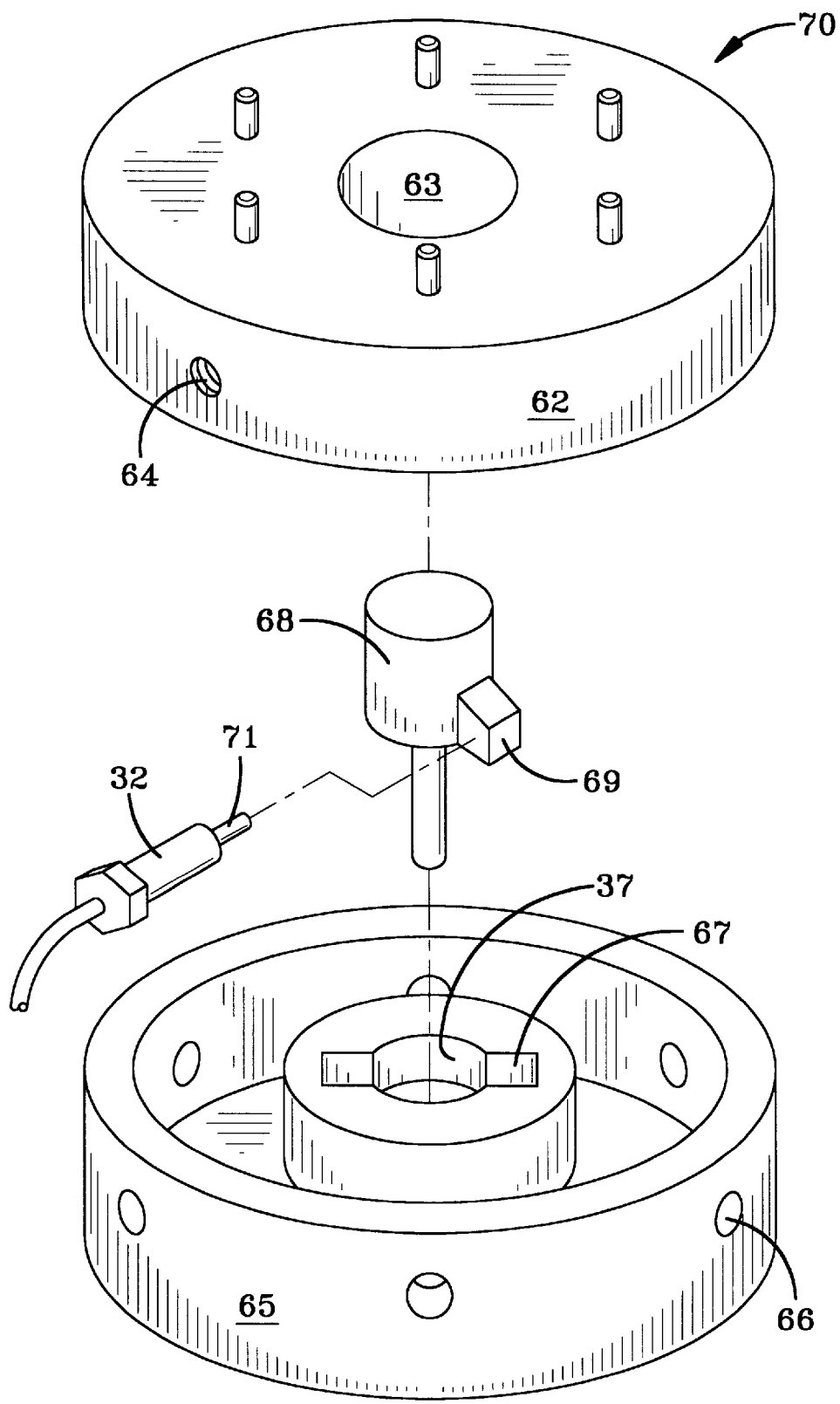
FIG. 4 illustrates another embodiment of this invention called the spin-and-drop embodiment which uses a rotatable column with a wing.

In another embodiment of this invention, FIG. 4 shows release mechanism 70, to be known herein after as the spin-and-drop embodiment, which has a support sleeve 62 with an axial opening 63 and an offset linear opening 64 which receives a protractor 32 as discussed above. Thrust diverter 65 has a female keyway 67 with a curved inner surface 37 and a plurality of holes 66 for diffusing the high pressure fluid. In this embodiment the sealing disc 35 (not shown in FIG. 4 but positioned and utilized in this embodiment as in the embodiment illustrated in FIGS. 1 and 3) is supported through axial opening 63 by column 68 which has a first wing 69. It may also desirable to use a second wing preferably symmetrically located 180° apart from first wing 69. This second wing (not shown) is preferably sized and shaped like first wing 69 and therefore able to fit inside keyway 67. It should also be noted, that it would be possible to have first wing 69 supported by support sleeve 62 instead of thrust diverter 65. This release mechanism 70 operates in the same manner as the preferred embodiment above except that when the protractor 32 extends piston 71 the piston 71 contacts first wing 69, rotating column 68 about its central longitudinal axis. As column 68 rotates, it contacts curved inner surface 37 in a way similar to the rotation of a round shaft inside a journal bearing. As soon as column 68 has rotated through a sufficient angle, first wing 69 aligns with female keyway 67. At that point, the column 68 would drop into the female key way 67, thus removing the support of the sealing disc by the column 68. Since the sealing disc cannot support the fluid pressure alone, it ruptures. The pressurized fluid would then be released from the pressure vessel in a manner similar to that discussed in the preferred embodiment.

Figure 5:
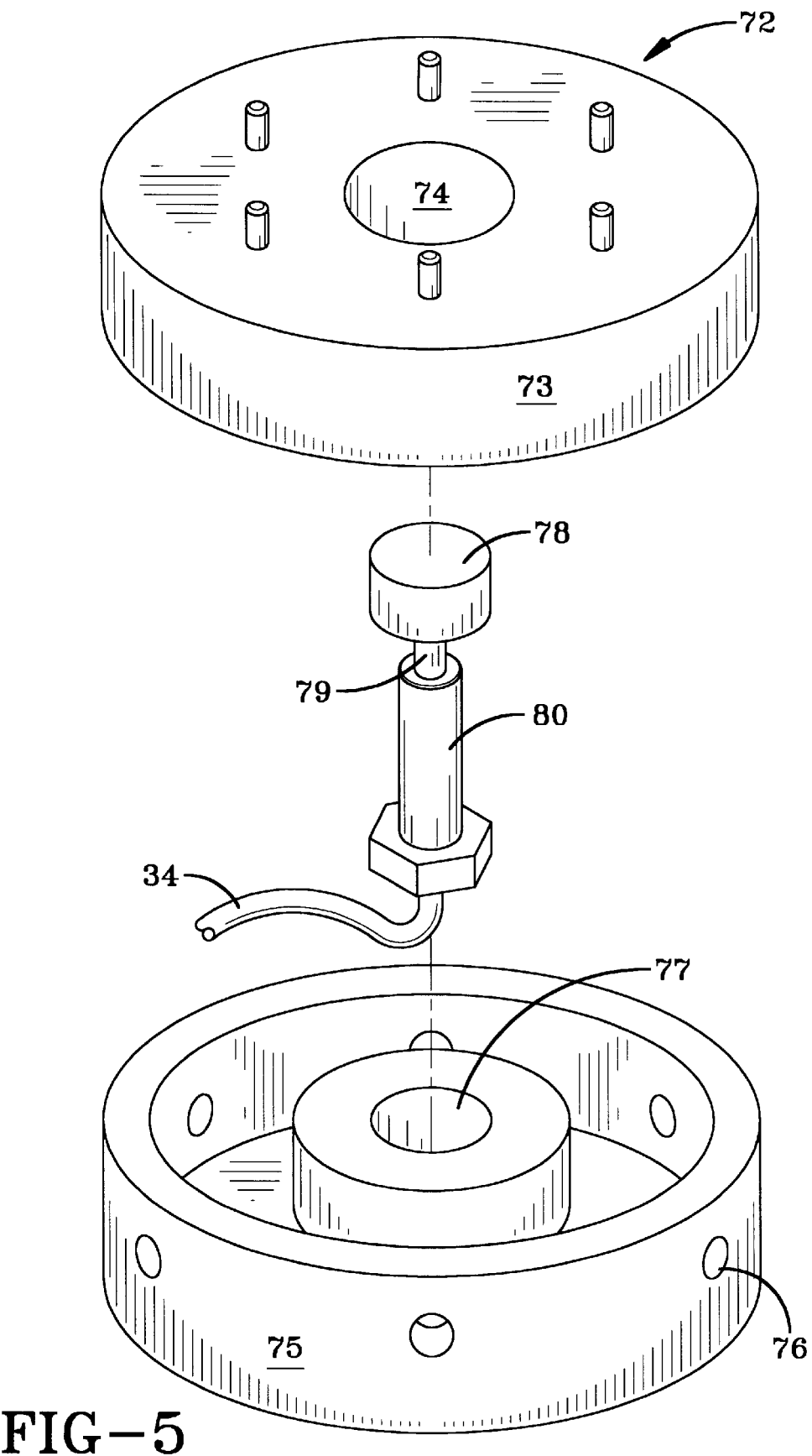
FIG. 5 illustrates still another embodiment of this invention called the retractor embodiment which uses a different type of actuator.

In another embodiment of this invention, FIG. 5 shows release mechanism 72, to be known herein after as the retractor embodiment, which has a support sleeve 73 with an axial opening 74. Thrust diverter 75 has a cavity 77 and a plurality of holes 76 for diffusing the high pressure fluid. In this embodiment the sealing disc (not shown in FIG. 5 but positioned and utilized in this embodiment as in the embodiment illustrated in FIGS. 1 and 3) is supported through axial opening 74 by support plug 78 which is mounted to the piston 79 of a self-contained pyrotechnic actuator which in this embodiment is retractor 80. It should be noted that retractor 80 is required to and is capable of bearing the static load it receives through the sealing disc (not shown here) throughout the storage life of the release mechanism 72. It should also be noted that retractor 80 could have been supported by support sleeve 73 instead of thrust diverter 75. The retractor 80 can be of any type currently available and in this preferred embodiment is made by ICI Nobel's Explosives of Ayrshire, Scotland. The proper size and type of retractor is chosen by sound engineering judgment depending on the use for the release mechanism 72. The retractor 80 has electrical contact means 34 for receiving an electrical control signal which would activate it. The retractor 80 is positioned in the cavity 77 of the thrust diverter 75. In the operation of the release mechanism 72, to selectively release the fluid within the associated pressure vessel, an electrical control signal is sent via electrical contact means 34 to the retractor 80. When it receives the electrical signal, the retractor retracts its piston 79 which lowers support plug 78 away from the sealing disc (not shown). The sealing disc, which cannot support the fluid pressure alone, then ruptures. The pressurized fluid would then be released from the pressure vessel in a manner similar to that discussed in the preferred embodiment.

Figure 7:
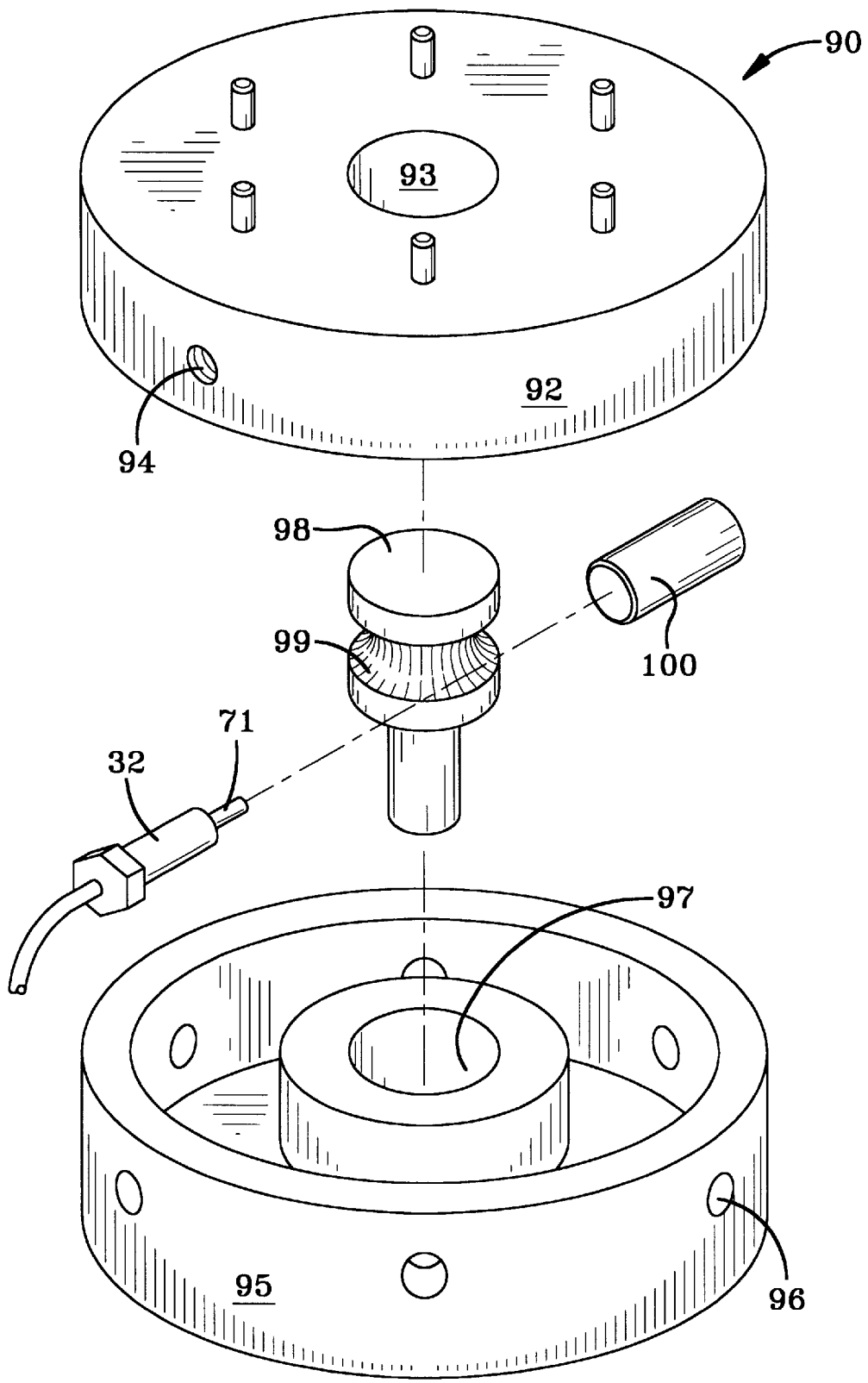
FIG. 7 illustrates another embodiment of this invention called the pin-and-drop embodiment which uses a pillar supported by a pin.
Figure 8:
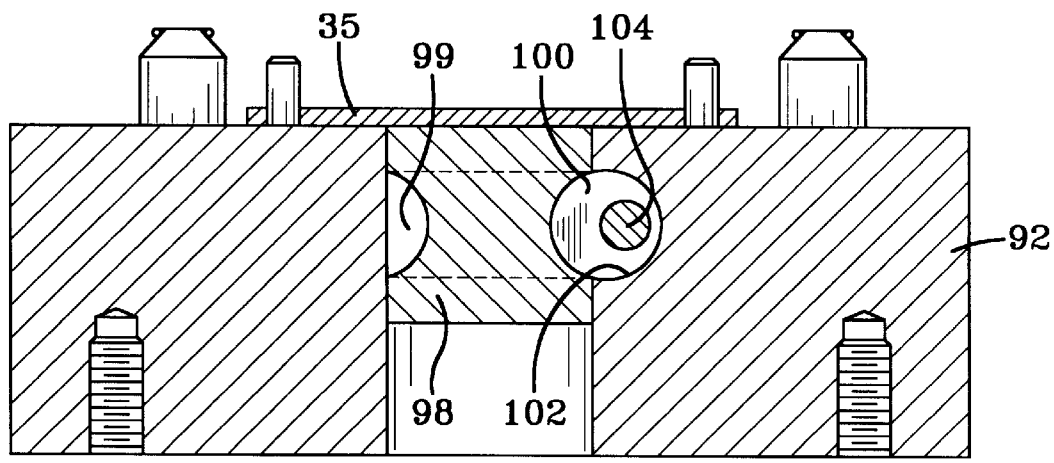
FIG. 8 is a cross-sectional view of the support sleeve and pillar of the pin-and-drop embodiment illustrating how the piston contacts the pin with off-center alignment.
Figure 9:
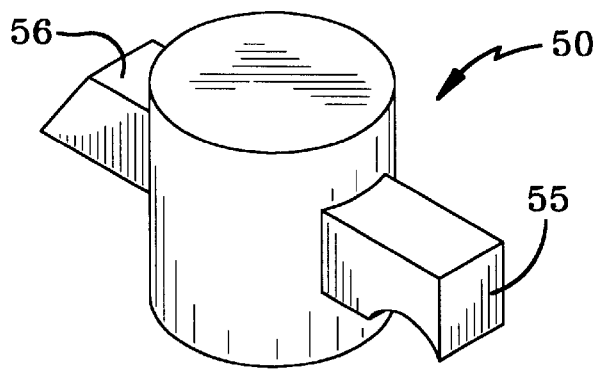
FIG. 9 is an enlarged, perspective view of the trap door used in the trap door embodiment.
Figure 10:
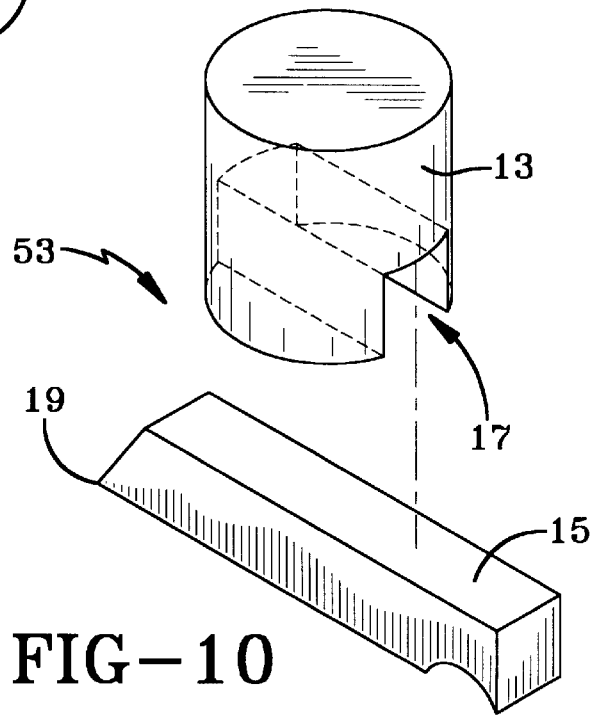
FIG. 10 is an enlarged, assembly view of an alternate trap door wherein the bar is replaceable.

In still another embodiment of this invention, FIGS. 7–8 show release mechanism 90, to be known herein after as the pin-and-drop embodiment and not to be confused with the spin-and-drop embodiment discussed above. Release mechanism 90 has a support sleeve 92 with an axial opening 93 and an offset linear opening 94 which receives a protractor 32 as discussed above. Thrust diverter 95 has a cavity 97 and a plurality of holes 96 for diffusing the high pressure fluid. In this embodiment the sealing disc 35 (shown in FIG. 8) is supported through axial opening 93 by pillar 98 which has a groove 99 around its circumference and is held in place by a slidable support member which in this embodiment is pin 100. As is best seen in FIG. 8, pin 100 has a substantially cylindrical cross-section enabling it to fit within groove 99 of pillar 98. Pin 100 is slidably positioned within channel 102 of support sleeve 92. Channel 102 is located so that its longitudinal axis is parallel to the longitudinal axis of offset linear opening 94. This release mechanism 90 operates in the same manner as the preferred embodiment above except that when the protractor 32 extends piston 71 the piston 71 slides pin 100 along channel 102 until the pillar 98 is no longer supported by pin 100. It should be noted that the alignment of piston 71 and pin 100 is off-center. By off-center it is meant that the longitudinal axis of piston 71 and the longitudinal axis of pin 100 are not precisely co-linear. This is illustrated in FIG. 8 which shows the contact area 104 of the pin 100 where piston 71 contacts pin 100 when activated. It can be clearly seen that contact area 104 is not concentric with pin 100. This off-center alignment is done so that when the piston 71 is extended it does not interfere with the motion of pillar 98. Once pillar 98 is no longer supported by pin 100, it drops into cavity 97, thus removing the support of sealing disc 35 by the pillar 98. Since the sealing disc 35 cannot support the fluid pressure alone, it ruptures. The pressurized fluid would then be released from the pressure vessel in a manner similar to that discussed in the preferred embodiment.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A release mechanism for releasing high pressure fluid from an associated pressure vessel having an opening, the release mechanism comprising:
   a substantially cylindrical connecting means with a diameter D1 for connecting the release mechanism to the opening in the associated pressure vessel, said connecting means having an opening;
   a substantially cylindrical support sleeve with a diameter D2 having first and second ends, said support sleeve having an axial opening;
   sealing means for sealing said opening of said connecting means, said sealing means interposed between said connecting means and said first end of said support sleeve;
   supporting means for supporting said sealing means, said supporting means positioned within said axial opening of said support sleeve, said supporting means comprising a hinge pin attached to said support sleeve, a trap door selectively pivotable about said hinge pin, and a T-shaped slidable support member selectively removing support from said trap door;
   securing means for securing said sealing means to said connecting means and said support sleeve, said securing means comprising a first dowel pin extending through said connecting means, said sealing means, and said first end of said support sleeve;
   first opening means for selectively opening said sealing means and,
   a substantially cylindrical thrust diverter with a diameter D3 for balancing thrust to the associated pressure vessel, said thrust diverter being attached to said second end of said support sleeve, said thrust diverter having a plurality of holes for diffusing the high pressure fluid from the associated pressure vessel, said thrust diverter having an opening therein which is concentric with said axial opening in said support sleeve and said opening in said connecting means, and D1, D2, and D3 being substantially the same.

2. The release mechanism of claim 1 further comprising a second opening means for opening said sealing means, said second opening means spontaneously opening said sealing means.

3. The release mechanism of claim 2 wherein said axial opening in said support sleeve has a diameter D5, said supporting means has a diameter D4, and D4 is between 50% and 99% of D5.

4. The release mechanism of claim 1 wherein said support sleeve also has an offset linear opening, said first opening means positioned within said offset linear opening of said support sleeve.

5. The release mechanism of claim 1 wherein said first opening means comprises a protractor for selectively removing said supporting means, said protractor responding to an electrical signal.

* * * * *